United States Patent
Provost et al.

(10) Patent No.: US 7,197,219 B2
(45) Date of Patent: Mar. 27, 2007

(54) CHROMATIC DISPERSION COMPENSATION MODULE

(75) Inventors: Lionel Provost, Marcoussis (FR);
Pierre Sansonetti, Palaiseau (FR);
Christine Moreau, Palaiseau (FR);
Laurent Gasca, Villebon sur Yvette (FR); Jean-Marc Blondy, Limoges (FR); Jean-Louis Auguste, Marcoussis (FR); Sebastien Fevrier, Limoges (FR);
Frederic Gerome, Limoges (FR)

(73) Assignee: Draka Comteq B.V. (NL)

( * ) Notice: Subject to any disclaimer, the term of this patent is extended or adjusted under 35 U.S.C. 154(b) by 0 days.

(21) Appl. No.: 10/989,335

(22) Filed: Nov. 17, 2004

(65) Prior Publication Data

US 2005/0254762 A1 Nov. 17, 2005

(30) Foreign Application Priority Data

Nov. 17, 2003 (FR) .................................. 03 13518

(51) Int. Cl.
*G02B 6/02* (2006.01)

(52) U.S. Cl. ....................................... 385/123; 385/126
(58) Field of Classification Search ................ 385/100, 385/123–128, 147, 23–29; 359/161, 577
See application file for complete search history.

(56) References Cited

U.S. PATENT DOCUMENTS 5,602,949 A * 2/1997 Epworth ....................... 385/37
5,742,723 A * 4/1998 Onishi et al. ................ 385/127
6,477,306 B2 * 11/2002 Kato et al. ................... 385/123
6,751,390 B2 * 6/2004 Qi et al. ...................... 385/127
6,912,348 B2 * 6/2005 Sillard et al. ................ 385/123

OTHER PUBLICATIONS

Koch et al, Effect of micro-bending on dispersion of dispersion compensating fibers, Electronics Letters, Apr. 15, 1999 vol. 35 No. 8.*
Accurate Tuning of the Highly-Negative-Chromatic-Dispersion Wavelength Into a Dual Concentric Core Fibre By Macro Bending; Fevrier, et al.; European Conference on Optical Communication; Copenhagen, Denmark; Sep. 8 to Sep. 12, 2002; European Conference on Optical Communication; vol. 3 of 4. Conf. 28; Sep. 11, 2002; p. P18 XP001158689.
Third Order Dispersion Compensation Realized by Applying Bending Birefringence to Fibres; Kato, et al.; Proc. Ecoc 1999, Nice, France, Soc. Electr. Electron, Paris, France, Sep. 26, 1999; pp. 60-61; vol. 2, XP002287913.
Effect of Macro-Bending on Dispersion of Dispersion Compensating Fibres; Koch, et al.; Electronics Letters, IEE Stevenage, GB, vol. 35, No. 8; Apr. 15, 1999; pp. 660-661; SP006012026.

* cited by examiner

*Primary Examiner*—Kevin S. Wood
(74) *Attorney, Agent, or Firm*—Sughrue Mion, PLLC

(57) ABSTRACT

An optical module for chromatic dispersion compensation comprises an optical fiber wound so as to present a variable radius of curvature. The fiber has an index profile such that it has, for the main propagation mode, a negative dispersion value having a minimum at a given wavelength in a given spectral band. The value and the spectral position of the dispersion minimum vary with the radius of curvature of the fiber. The module allows the introduction of a large chromatic dispersion compensation value overall of a given spectral band, as well as compensation corrections for specific wavelengths inside the given spectral band.

14 Claims, 2 Drawing Sheets

CHROMATIC DISPERSION COMPENSATION MODULE

Figure 1:
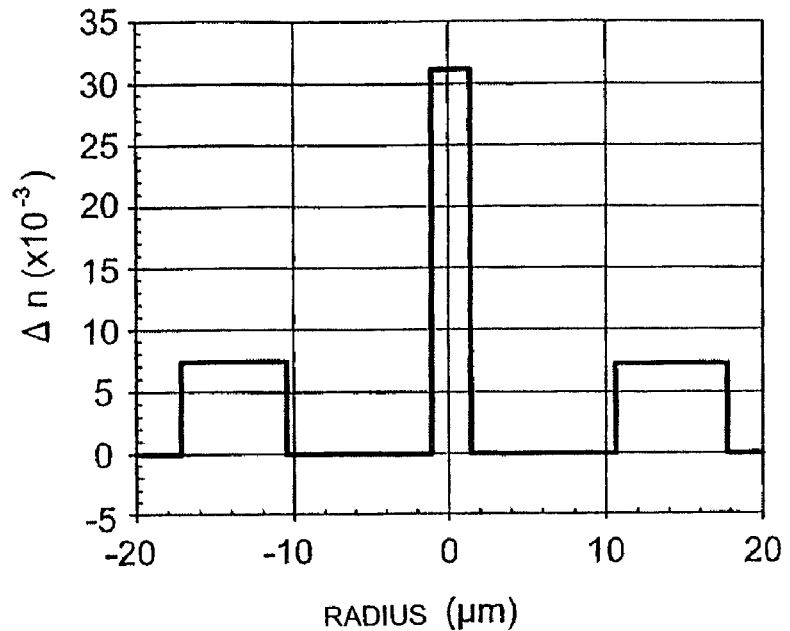

The present invention relates to the field of optical fiber transmissions, and more specifically to the compensation of the chromatic dispersion and the chromatic dispersion slope in optical fiber transmission systems.

For optical fibers the index profile is generally described in relation to the shape of the graph of the function which associates the refractive index with the radius of the fiber. The distance r to the centre of the fiber is conventionally represented on the abscissae, and the difference between the refractive index of the core and the refractive index of the cladding of the fiber on the ordinates. Thus, "step", "trapezoid" or "triangle" are terms used to describe the index profile for graphs which are respectively in step, trapezoid or triangle form. These curves are generally representative of the theoretical or reference profile of the fiber, as fiber-production constraints can lead to a noticeably different profile.

In the new high-output wavelength-multiplexed transmission networks, called WDM standing for Wavelength Division Multiplexing, it is advantageous to control the chromatic dispersion, in particular for outputs higher than or equal to 40 Gbit/s or 160 Gbit/s. The aim is to obtain, for all the wavelength values of the multiplex, a cumulative chromatic dispersion which is more or less zero on the link, so as to limit pulse broadening. All of the chromatic dispersion over the length of the fiber is called "cumulative chromatic dispersion"; at constant chromatic dispersion, the cumulative chromatic dispersion is equal to the product of the chromatic dispersion times the length of the fiber. A cumulative value of some tens of ps/nm for the total dispersion is generally acceptable. It is also worthwhile to avoid, in the vicinity of the wavelengths used in the system, zero values of the local chromatic dispersion for which the non-linear effects are greater. Finally, it is also worthwhile to limit the cumulative chromatic dispersion slope on the multiplex range so as to avoid or limit the distortions between the multiplex channels. This slope is normally the derivative of the chromatic dispersion relative to the wavelength.

Index step fibers, also called SMF fibers (English acronym for "Single Mode Fiber"), or non-zero dispersion shifted fibers, also called NZ-DSF+ fibers (English acronym for "Non-Zero Dispersion Shifted Fiber") are normally used as line fibers for optical fiber transmission systems. NZ-DSF+ fibers are dispersion shifted fibers, having a chromatic dispersion which is not zero and slightly positive for the wavelengths at which they are used, typically around 1550 nm. These fibers have a small chromatic dispersion for these wavelengths, typically less than 11 ps/(nm.km) at 1550 nm, and a chromatic dispersion slope between 0.04 and 0.1 ps/(nm².km). The SMF fibers have, for these same wavelengths, a typical chromatic dispersion of 17 ps/(nm.km) at 1550 nm, and a chromatic dispersion slope of approximately 0.056 ps/(nm².km).

In order to compensate the chromatic dispersion and the chromatic dispersion slope in SMF or NZ-DSF+ fibers used as line fibers, it is known to use small lengths of dispersion compensating fiber or DCF (Dispersion Compensating Fiber). DCF fibers are described for example in U.S. Pat. No. 5,568,583 or U.S. Pat. No. 5,361,319, for the compensation of the cumulative chromatic dispersion in an SMF fiber. EP-A-1 067 412 or the French patent application filed under number 01 06246246 describe dispersion compensating fibers suitable for compensating the chromatic dispersion and the chromatic dispersion slope of a DSF fiber with positive chromatic dispersion in the transmission band. These known dispersion compensating fibers have a negative chromatic dispersion and a negative chromatic dispersion slope in the vicinity of a wavelength of 1550 nm.

Generally it is sought to observe the following relationship:

$$(D/D')L_{SMF} = (D/D')L_{DCF}$$

where, D: the value of the chromatic dispersion;
D': the value of the dispersion slope;
$L_{SMF}$: the length of line fiber;
$L_{DCF}$: the length of compensating fiber.

Thus, for a given section of line fiber, it will be necessary to join a given section of compensating fiber, the length of compensating fiber used depending directly on its negative dispersion value and its negative dispersion slope.

It is sought to realize fiber profiles which allow very high negative chromatic dispersion and dispersion slope values to be attained in order to limit the lengths of compensating fibers used in the transmission systems. Such a chromatic dispersion compensating fiber profile is described for example in the publication "A Novel Design of a Dispersion Compensating Fiber", by K. Thya-arajan, R. K. Varshney, P. Palai, A. K. Ghatak, and I. C. Goyal, IEEE Photonics Technology Letters, Vol. 8, No. 11, November 1996, pp 1510–1512. Such a profile allows a negative dispersion of less than −4500 ps/(nm.km) at 1500 nm to be achieved.

However, such a fiber profile means a reduced effective area and the appearance of major non-linear effects when the optical signal is propagated in such a fiber.

Document WO 02/21172 proposes another chromatic dispersion compensating fiber profile which seeks to reconcile a minimal effective area with a major negative chromatic dispersion. Such a fiber has a dispersion of less than −150 ps/(nm.km) at 1550 nm with an effective area between 12 μm² and 25 μm².

Another profile is described in the publication "−1800 ps/(nm.km) chromatic dispersion at 1.55 μm in dual concentric core fiber" by J. L. Auguste, R. Jindal, J. M. Blondy, M. Clapeau, J. Marcou, B. Dussardier, G. Monnom, D. B. Ostrowsky, B. P. Pal and K. Thyagarajan, Electronics Letters, 28 Sep. 2000, Vol. 36, No. 20, pp. 1689–1691. Such a dual-core fiber profile allows a large local dispersion compensation to be achieved in the transmission window at 1.55 μm. A dispersion of −1800 ps/(nm.km) was measured at 1.558 μm.

Such a compensation value is limited however to a given wavelength. Within WDM transmission systems, it is necessary to compensate the dispersion over all the transmission channels of a given band.

The publication "Accurate tuning of the highly-negative-chromatic-dispersion wavelength into a dual concentric core fiber by macro-bending" by S. Février, J. L. Auguste, J. M. Blondy, A. Peyrilloux, P. Ray, D. Pagnoux, Proceedings of the ECOC 2002, Poster session, P1.08, Copenhagen, Denmark, describes a fiber profile having a strong minimum of negative chromatic dispersion, around −1800 ps/(nm.km), at a given wavelength. This minimum can be shifted spectrally and its value modified by bending the fiber.

Moreover, document WO 02/099483 proposes a device to adjust the chromatic dispersion through an action confined to a dispersion compensating fiber. This action can be thermal or mechanical and allows compensation of the chromatic dispersion of the signal to be modified with a feedback loop. Such an action allows a dynamic modification of the dispersion compensation that is confined to a given wavelength. Such a device does not allow a chromatic compensation to be realized over a wide spectral band. Such a device allows a chromatic dispersion between −70 ps/(nm.km) and −140 ps/(nm.km) to be attained for wavelengths between 1520 nm and 1570 nm.

The present invention proposes a dispersion and dispersion slope compensation module which allows a dispersion compensation to be realized of all of the wavelengths of a given spectral band for a multiplexed optical signal which is propagated with a chromatic dispersion and a dispersion slope that is positive over said spectral band. This compensation is effective while at the same time minimizing the appearance of non-linear effects in the propagation of the signal.

To this end, the invention proposes an optical chromatic dispersion compensation module comprising an optical fiber wound so as to have a variable radius of curvature, the fiber having an index profile such that it has, for the main propagation mode, a negative chromatic dispersion value having a minimum at a given wavelength in a given spectral band, the value and the spectral position of the dispersion minimum varying with the radius of curvature of the fiber.

According to a characteristic, the value of the chromatic dispersion minimum of the fiber of the module is less than −500 ps/(nm.km).

According to a characteristic, the fiber of the module is a dual-core fiber comprising a central core with a refractive index $n_1$, a cladding with a refractive index $n_2$ and a ring core with a refractive index $n_3$, the profile of the fiber being such that the difference in index between the central core and the cladding ($\Delta n = n_1 - n_2$) is higher than or equal to $25 \times 10^{-3}$ and the difference in index between the ring core and the cladding ($\Delta n' = n_3 - n_2$) is higher than or equal to $5 \times 10^{-3}$, the difference in refractive index between the zone situated between the two concentric cores and the cladding being more or less equal to zero.

According to a characteristic the ring core of the fiber of the module is between 5 μm and 8 μm wide.

According to a characteristic, the zone situated between the two concentric cores of the fiber of the module is between 7 μm and 11 μm wide.

According to a characteristic, the radius of curvature of the fiber of the module varies between 2 cm and 30 cm.

According to a characteristic, a portion of the fiber of the module has an infinite radius of curvature.

According to a characteristic, the fiber is wound so that the module has a dispersion coefficient of less than −500 ps/(nm.km) in a given spectral band having a width greater than or equal to 5 nm.

According to a characteristic, the given spectral band is the C-band or the L-band.

The invention also relates to an optical transmission system comprising a transmission line and at least one chromatic dispersion compensation module according to the invention.

According to a characteristic, the transmission system comprises a dispersion compensation module on entering the line and a dispersion compensation module on leaving the line.

According to a characteristic, the transmission system also comprises a chromatic dispersion compensating fiber (DCF), the variation of the radius of curvature of the fiber of the dispersion compensation module according to the invention being adjusted to correct the dispersion compensation faults of the chromatic dispersion compensating fiber (DCF).

According to a characteristic, the transmission system also comprises means for adjusting the winding of the fiber in the dispersion compensation module.

Figure 2:
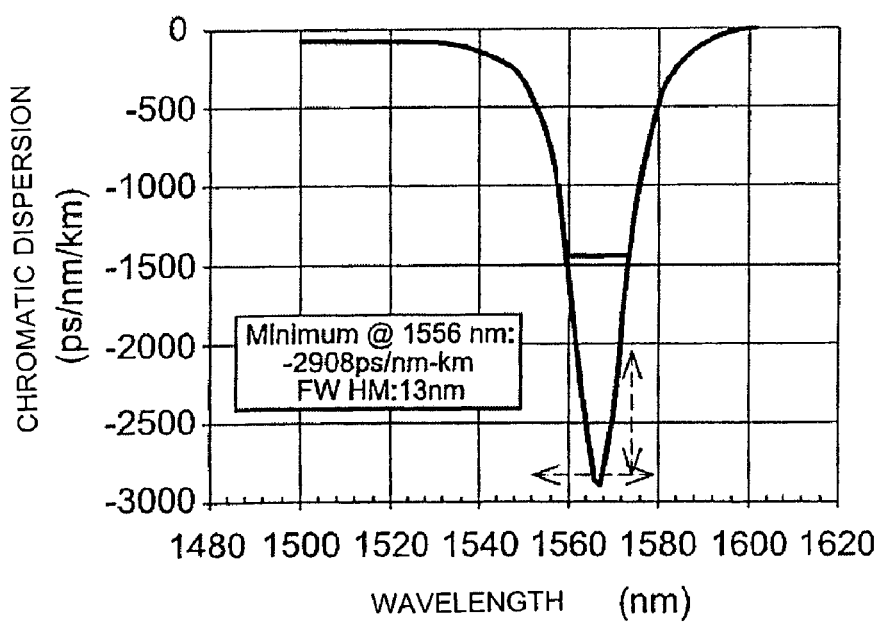
Figure 3A:
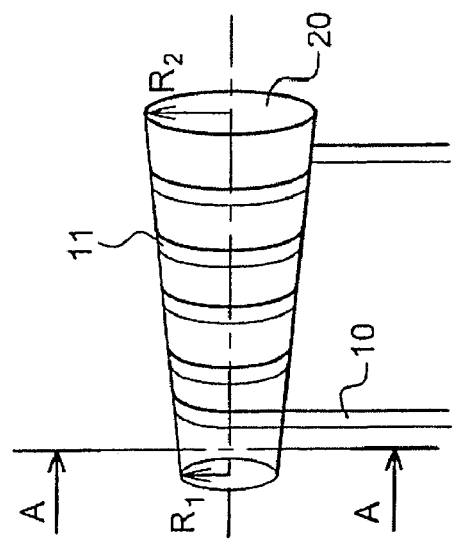
Figure 3B:
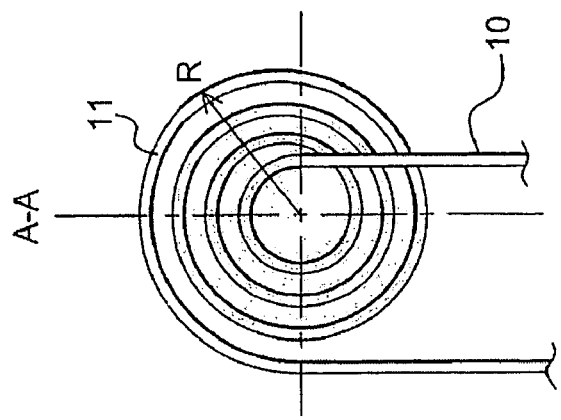
Figure 4:
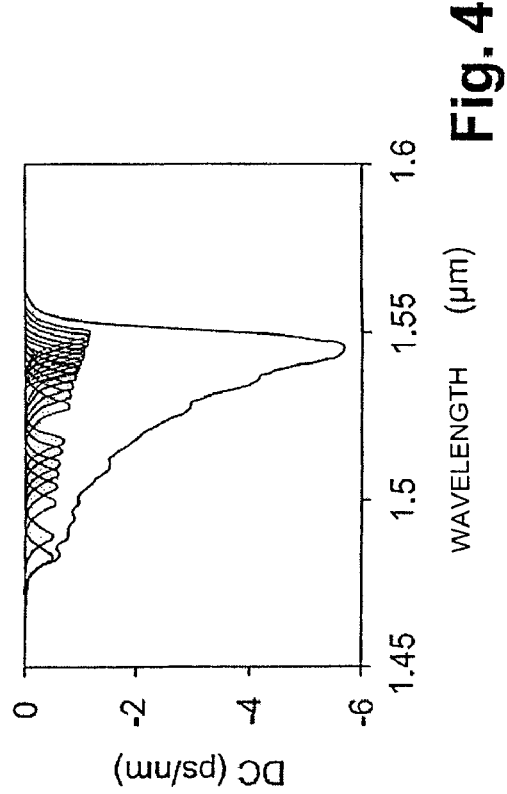

The characteristics and advantages of the invention will become clearer when reading the following description, provided by way of an illustrative and non-limitative example, and with reference to the attached figures which represent:

FIG. 1, an index profile of a fiber used in the module according to the invention;

FIG. 2, a simulated chromatic dispersion curve of the fiber of FIG. 1 in relation to wavelength;

FIG. 3a, a schematic side view of a dispersion compensation module according to the invention;

FIG. 3b, a schematic section view of FIG. 3a;

FIG. 4, a simulated chromatic dispersion curve of a module of FIG. 3 in relation to wavelength.

According to the invention, an optical chromatic dispersion compensation module comprises an optical fiber wound so as to have a variable radius of curvature. The fiber can be wound onto any suitable shape which allows a variation of the radius of curvature between two given points of the fiber, which variation can be linear or non-linear. For example, a shape, such as a cone, is suitable for obtaining a linear variation of the radius of curvature.

The fiber has a refractive index profile presenting a negative dispersion coefficient having a minimum at a given wavelength in a given spectral band. This spectral behaviour of the chromatic dispersion is verified for the main propagation mode of the fiber which can be multimode in some applications. Moreover the refractive index profile of the fiber is such that the value and the spectral position of the dispersion minimum varies with the radius of curvature of the fiber.

A chromatic dispersion compensation can thus be realized over all of a given spectral band and not only at a given wavelength.

Moreover, compensation corrections can be introduced for specific wavelengths within a given spectral band.

FIG. 1 schematically illustrates the index profile of a fiber which can be used in a dispersion compensation module according to the invention.

The fiber is a dual-core fiber which comprises a central core with a refractive index $n_1$, a cladding with a refractive index $n_2$ and a ring core with a refractive index $n_3$. The profile of the fiber is such that the difference in index between the central core and the cladding ($\Delta n = n_1 - n_2$) is greater than or equal to $25 \times 10^{-3}$; and the difference in index between the ring core and the cladding ($\Delta n' = n_3 - n_2$) is greater than or equal to $5 \times 10^{-3}$. Moreover, the difference in refractive index between the zone situated between the two concentric cores and the cladding is more or less equal to zero.

The central core is very narrow, with a radius between 0.75 μm and 2 μm and has a large index step. The ring core has a much smaller index step than the central core and is between 5 μm and 8 μm wide. The zone situated between the two concentric cores can be between 7 μm and 11 μm wide, this zone is moreover not embedded, that is to say that it does not have a negative refractive index relative to the refractive index $n_3$ of the cladding. The difference in index between this zone and the cladding is more or less equal to zero. This difference in index can be slightly negative, of the order of $-3 \times 10^{-3}$ to $-2 \times 10^{-3}$ without it being considered that this zone is embedded.

A fiber with such an index profile has an effective area greater than 15 μm². This value allows in particular the limiting of non-linear effects.

The propagation of an optical signal in a fiber having such an index profile with two very asymmetrical concentric cores is described in the previously cited publication "−1800 ps/(nm.km) chromatic dispersion at 1.55 μm in dual concentric core fiber" by J. L. Auguste et al.

FIG. 2 shows a simulated chromatic dispersion curve in relation to wavelength in a portion of the fiber of FIG. 1.

The chromatic dispersion D can be calculated according to the following formula:

$$D = -\lambda/c * d^2 n_e/d\lambda^2$$

where, c, constant of the speed of light;
λ wavelength;
$n_e$, effective index.

It is seen in the simulated curve of FIG. 2 that the value of the chromatic dispersion depends greatly on the wavelength in the case of a fiber having the index profile of FIG. 1. The curve has a minimum at a given wavelength, of −2908 ps/(nm.km) at 1566 nm in the example considered. This minimum peak is very selective and is 13 nm wide at half-height (FWHM).

It is thus possible to introduce a very strong negative dispersion compensation at a given wavelength.

Moreover it has been found that the value and the spectral position of this negative dispersion minimum peak was able to vary with the radius of curvature of the fiber. This has been described in particular in the previously mentioned publication "Accurate tuning of the highly-negative-chromatic-dispersion wavelength into a dual concentric core fiber by macro-bending" by S. Février et al.

FIGS. 3a and 3b illustrate an embodiment of a dispersion compensation module according to the invention.

The module according to the invention comprises an optical fiber 10, having an index profile as is described with reference to FIG. 1. At least one portion 11 of this fiber 10 is wound so as to present a variable radius of curvature. By variable radius of curvature is meant a curvature value differing between two given points of the fiber; and not a constant curvature value of the fiber which differs according to different embodiments.

A portion 11 of the fiber 10 can thus be wound onto any suitable shape 20 which allows a variation of the radius of curvature R between two given points of the fiber. This variation of the radius of curvature R can be linear or non-linear. For example, a shape, such as a cone 20, is suitable for obtaining a linear variation of the radius of curvature R.

Thus, a first portion of the fiber presents a radius of curvature R1 which corresponds to a negative chromatic dispersion minimum of a given value and at a given wavelength; while another portion of the fiber presents a radius of curvature R2, different from R1, which corresponds to another negative chromatic dispersion minimum of a given value and at a given wavelength. Because the values and spectral positions of negative dispersion peaks on the same portion of fiber 11 differ, a strong negative dispersion can be introduced over all of a given spectral band and not just for a given wavelength value.

Thus, for all of a given spectral band, of a width greater than or equal to 5 nm, the value of the chromatic dispersion of the module according to the invention can be less than or equal to −500 ps/(nm.km). In particular, the given spectral band can be all or part of the C-band or the L-band or any other spectral band or sub-band used for optical transmission.

The variations of the radius of curvature R over the portion of fiber 11 are adjusted according to the applications. The radius of curvature R can vary from 2 cm, or even less, to 30 cm, or even more, with one or more portions which are straight, i.e. having an infinite radius of curvature.

The fiber can also be wound onto several shapes with different diameters. The module can then be adjustable, in relation to the lengths of fiber wound onto one or other of the shapes.

FIG. 4 illustrates an application of the module according to the invention. The plotted dispersion values correspond to the chromatic dispersion of a modelized arrangement with 150 m of fiber on a cone.

If a given dispersion curve on a given spectral band is considered, constituting a template dispersion curve (solid-line curve), it is possible to break this curve down into a plurality of elementary chromatic dispersion responses at given wavelengths (dotted-line curves), each of these elementary responses being obtained by the fiber having a given radius of curvature.

Thus, the module according to the invention allows not only a strong chromatic dispersion compensation over a given band but also allows a confined correction of dispersion compensation by introducing a stronger negative dispersion over a given wavelength or given wavelengths.

The module according to the invention thus has an application in optical transmission systems comprising transmission lines introducing a positive chromatic dispersion, such as the SMF or NZ-DSF+ fibers described previously.

According to one application, a module according to the invention can be placed at the start of the transmission line and another module at the end of the line. The introduction of a large negative dispersion value over all of a spectral band allows the chromatic dispersion of a large length of transmission fiber to be compensated for with a limited length of fiber wound up in a module according to the invention.

According to another application, which can be in addition to the first, the module according to the invention can be arranged in a transmission system comprising a transmission fiber, such as an SMF, and a standard dispersion compensating fiber, such as the DCFs mentioned previously. The module according to the invention can then allow local correction of a chromatic dispersion compensation fault of the DCF. For example, if some wavelengths of the spectral band considered are not compensated for sufficiently, the module according to the invention can make up for this disparity by adjusting a portion of the specific fiber with the adapted radius of curvature.

In particular, the transmission system can comprise means for adjusting the winding of the specific fiber of the module according to the invention. For example, by shifting all or a portion of the fiber of the module along a conical cylinder, changing the shape of the winding, or winding up a greater or lesser length of fiber on different cylinders with different diameters.

The module according to the invention can thus greatly compensate for a positive chromatic dispersion over a wide spectral band and/or correct locally in a spectral band a chromatic dispersion disparity at a given wavelength.

Moreover, the chromatic dispersion compensation with a module according to the invention can be adjusted when laying the line and subsequently varied according to the evolution of the line.

Of course, the invention is not limited to the examples proposed above. In particular, the variations of the radius of curvature over the portion of fiber can be adjusted and the index profile of the fiber can be adjusted according to the application.

The invention claimed is:

1. Optical chromatic dispersion compensation module comprising an optical chromatic dispersion compensating fiber wound on a shape which allows a variation of the radius of curvature between two given points of said optical fiber so as to have a variable radius of curvature, the fiber having an index profile such that it has, for the main propagation mode, a negative chromatic dispersion value having a minimum at a given wavelength in a given spectral band, the value and the spectral position of the dispersion minimum varying with the radius of curvature of the fiber.

2. Optical module according to claim 1, characterized in that the value of the dispersion minimum of the fiber of the module is less than −500 ps/(nm.km).

3. Optical module according to claim 1, characterized in that the fiber is a dual-core fiber comprising a central core with a refractive index $n_1$, a cladding with a refractive index $n_2$ and a ring core with a refractive index $n_3$, the profile of the fiber being such that the difference in index between the central core and the cladding ($\Delta = n_1 - n_2$) is higher than or equal to $25 \times 10^{-3}$ and the difference in index between the ring core and the cladding ($\Delta n' = n_3 - n_2$) is higher than or equal to $5 \times 10^{-3}$, the difference in refractive index of the zone situated between the two concentric cores and the cladding being more or less equal to zero.

4. Optical module according to claim 3, characterized in that the ring core is between 5 μm and 8 μm wide.

5. Optical module according to claim 3, characterized in that the zone situated between the two concentric cores is between 7 μm and 11 μm wide.

6. Optical module according to claim 1, characterized in that the radius of curvature of the fiber varies between 2 cm and 30 cm.

7. Optical module according to claim 1, characterized in that a portion of the fiber has an infinite radius of curvature.

8. Optical module according to claim 1, characterized in that the fiber is wound so that the module has a dispersion coefficient of less than −500 ps/(nm/km) in a given spectral band having a width greater than or equal to 5 nm.

9. Optical module according to claim 8, characterized in that the given spectral band is the C-band.

10. Optical module according to claim 8, characterized in that the given spectral band is the L-band.

11. Optical transmission system comprising a transmission line and at least one chromatic dispersion compensation module according to claim 1.

12. Optical transmission system according to claim 11, characterized in that it comprises a dispersion compensation module on entering the line and a dispersion compensation module on leaving the line.

13. Optical transmission system according to claim 11, characterized in that it also comprises a chromatic dispersion compensating fiber (DCF), the variation of the radius of curvature of the fiber of the dispersion compensation module being adjusted to correct dispersion compensation faults of the chromatic dispersion compensating fiber (DCF).

14. Optical transmission system according to claim 11, characterized in that it also comprises means for adjusting the winding of the fiber in the dispersion compensation module.

* * * * *